J. GEIER.
SURVEYOR'S INSTRUMENT.
APPLICATION FILED MAR. 18, 1914.

1,133,123.

Patented Mar. 23, 1915.
2 SHEETS—SHEET 1.

Witnesses
W. A. Williams
Dudley Browne

Inventor
James Geier.

By (signature)
Attorney

J. GEIER.
SURVEYOR'S INSTRUMENT.
APPLICATION FILED MAR. 18, 1914.
1,133,123.
Patented Mar. 23, 1915.
2 SHEETS—SHEET 2.
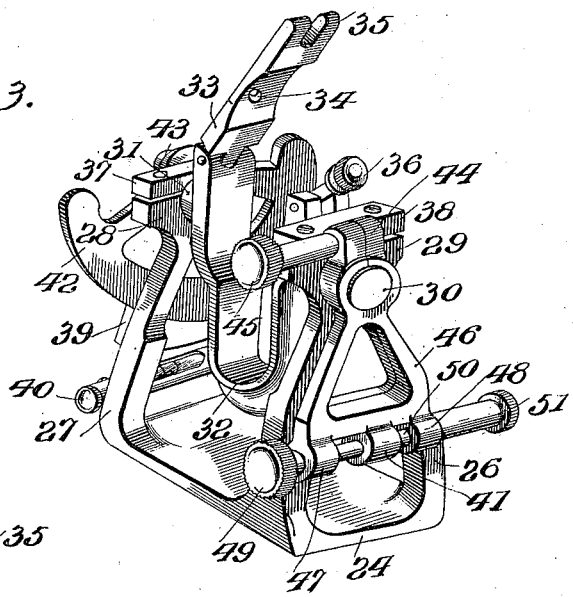
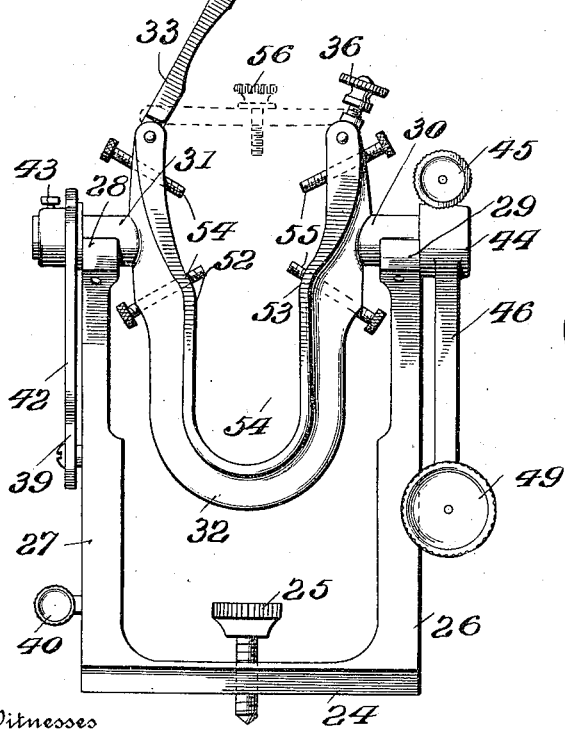
Inventor
James Geier

UNITED STATES PATENT OFFICE.

JAMES GEIER, OF TROY, NEW YORK.

SURVEYOR'S INSTRUMENT.

1,133,123.   Specification of Letters Patent.   Patented Mar. 23, 1915.

Application filed March 18, 1914. Serial No. 825,589.

*To all whom it may concern:*

Be it known that I, JAMES GEIER, a citizen of the United States, residing at Troy, in the county of Rensselaer and State of New York, have invented certain new and useful Improvements in Surveyors' Instruments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to surveyors' instruments and more particularly to that class of surveyors' instruments adapted to be used interchangeably.

The object of this invention is to provide an attachment whereby the ordinary surveyor's Y level may be interchangeably used as a level or a transit.

A further object of this invention is to provide an attachment for a level by means of which the horizontal and vertical angles may be determined.

A still further object of this invention is to provide a level attachment having a vertical arc, tangent clamp, vernier and spirit level in combination therewith.

With these and other objects in view, this invention consists in the combination and arrangement of the various detachable members and parts of a combined surveyor's level and transit as hereinafter described and more particularly set forth in the appended claims.

Figure 1:
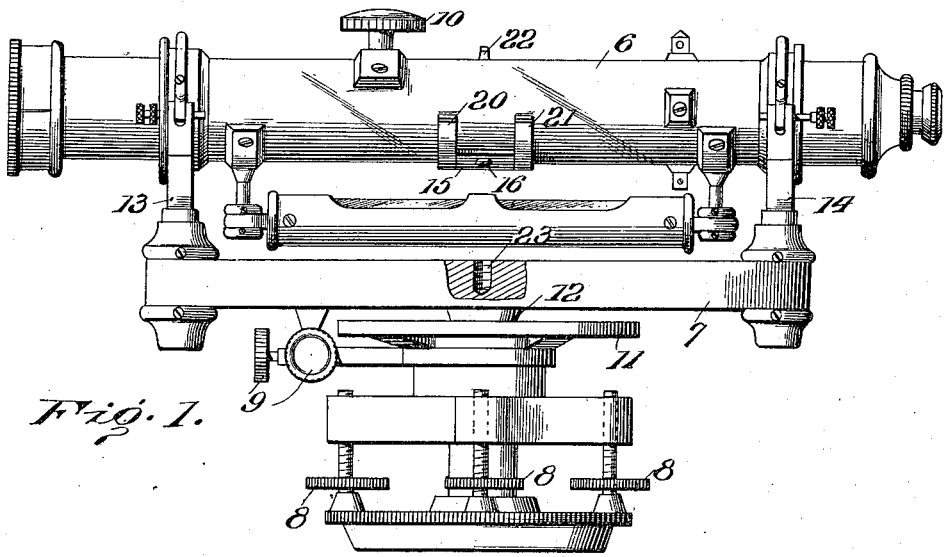
Figure 2:
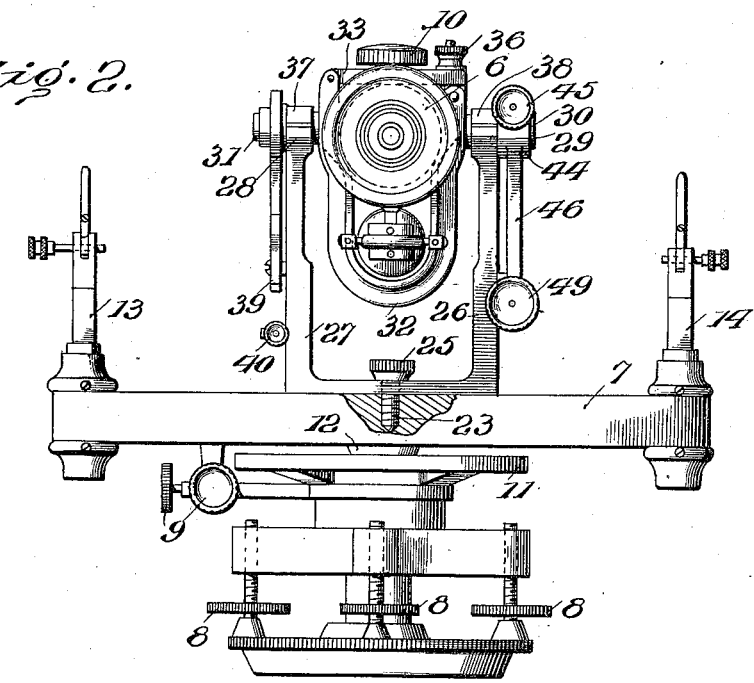

Referring to the drawings forming a portion of this specification wherein similar reference numerals indicate similar parts wherever used: Figure 1 is a side elevation of a level embodying a portion of this invention. Fig. 2 is a rear elevation of the level used as a transit by means of the attachment. Fig. 3 is a perspective view of the attachment used to convert the level into a transit. Fig. 4 is a rear view of a modification of the device shown in Fig. 3. Fig. 5 is a detail perspective view of the attachment placed on the barrel of the level telescope to coöperate with the transit attachment.

The numeral 6 designates an ordinary surveyor's or architect's Y level telescope provided with the usual beam 7 and adjusting means 8, 9 and 10, the usual graduated circle 11, the corresponding vernier 12 and the supporting Y's 13 and 14. Secured to the level telescope at the longitudinal center thereof is a semi-circular band 15 secured in place upon the telescope barrel by means of screws 16 and 17. The band 15 has four projections 18, 19, 20 and 21, extending from the corners thereof and so bent as to follow the contour of the telescope barrel and to lie in contact therewith. On the upper edge of the telescope is a small lug 22, the function of which will be hereinafter explained. Provided in the beam 7 is a central screw threaded recess 23.

The attachment coöperating with the above described means to convert the level into a transit is more particularly illustrated in Figs. 3 and 4 and comprises a base 24 provided with a thumb screw 25 and having upwardly extending arms 26 and 27, terminating in semi-circular bearings 28 and 29. Supported in these bearings by means of stub pivots 30 and 31 is a removable U-shaped yoke 32 having internal shoulders 52 and 53 and which carries a pivoted closure block 33 having a central aperture 34 and a bifurcated end 35 adapted to receive a pivoted set screw 36 on the opposite arm of the U yoke. In order to accommodate any size of level telescope the yoke 32 is provided adjacent the shoulders 52 and 53 with set screws 54 and 55. A further set screw 56 may be provided in the aperture 34 of the closure 33. This is a modification of the invention and is illustrated only in Fig. 4.

The bearings are closed by means of bearing blocks 37 and 38 which are provided with suitable screws adapted to fasten the blocks to the bearings. This construction leaves the yoke 32 free to swing upon the standards 26 and 27. Secured to the outer side of the arm 27 is a vernier 39 and below the vernier is a small spirit level 40. The standard 26 has formed integral therewith a lug 41 hereinafter referred to. Stub shaft 31 carries upon its end outside the arm 27 a removable vertical arc 42 held in place upon the shaft by means of a screw 43. This vertical arc is so placed as to coöperate with the vernier 39. Supported outside of the arm 26 upon the stub shaft 30 by means of a split collar 44, the size of which is regulated by a set screw 45 is a member 46 having bearing members 47 and 48 formed thereon. Passing through the bearing 47 and abutting against the lug 41 of the standard 26 is a set screw 49. Extending through the bearing 48 and abutting against the other side of the lug 41 is a rod 50 which acts against a spring contained within a cylinder 51 which is screw threaded into the bearings 48. By operating the set screw 49 the member 46 is made to move, using the shaft 30 as a center and either causing the shaft to move or moving free upon said shaft according to whether the split ring 44 is tight or loose upon the shaft 30.

The operation of this device is as follows: When used as a level the telescope is placed in the Y's as shown in Fig. 1. When it is desired to convert the instrument for use as a transit the telescope is removed from the Y's and the attachment shown in Figs. 3 and 4 placed upon the beam 7 as shown in Fig. 2. The set screw 25 is screwed tightly within the threaded recess 23. The telescope 5 is placed in position within the yoke 32, the shoulders 52 and 53 of the yoke receiving the telescope and the four projections 18, 19, 20 and 21 of the band 15 upon the telescope engage the outer edges of each of the sides of the yoke 32, thus preventing any longitudinal movement of the telescope. The space 54 in the yoke 32 receives the usual spirit level carried by the telescope. The block 33 is now fastened in place by means of the screw 36, the lug 22 engaging the aperture 34 to prevent any lateral movement of the telescope. Angular adjustment of the instrument is accomplished by means of the screw 49 which acts as a tangent in common with the member 46 and the split ring 44 acting upon the shaft 30. The readings for the angles may be ascertained upon the arc 42 in connection with the vernier 39 and the entire instrument operated as a transit.

Considerable variation from the details as herein described may be practised without departing from the spirit of this invention, and it is intended to construe the claims not only in the light of the foregoing, but as broadly as the state of the prior art will permit.

What I claim as new and desire to secure by U. S. Letters Patent, is:—

1. A transit attachment comprising in combination a plurality of standards, a telescope support mounted on said standards, said support comprising a U-yoke provided with internal shoulders adapted to receive the telescope, means for closing the open end of the U-yoke and means carried by said yoke adjacent said shoulders adapted to hold a telescope in said position.

2. A transit attachment comprising in combination a plurality of standards, a telescope support mounted on said standards, said support comprising a U-yoke provided with internal shoulders adapted to receive a telescope, means carried by said yoke adapted to hold a telescope in position, said means comprising a pivoted block having a bifurcated end, and a set screw engaging said end to hold said block against the telescope, and adjustable means carried by the yoke adjacent said shoulders adapted to receive various sized telescopes.

3. In a convertible Y level, the combination with a telescope, of a band secured thereto, a leg formed at each corner of said band, means for supporting the telescope for use as a transit, said means comprising a base having upwardly extending arms provided with bearings, a U-yoke adapted to receive the band on said telescope, the legs of said band engaging the outer edges of said yoke, adjustable means adjacent said shoulders adapted to engage the telescope, means for closing the open end of said yoke, and means for varying the angle of the yoke and the telescope.

In testimony whereof I have signed my name to this specification in the presence of two subscribing witnesses.

JAMES GEIER.

Witnesses:
 RASMUS NIELSEN,
 JOSEPH BLUHNY.

Copies of this patent may be obtained for five cents each, by addressing the "Commissioner of Patents, Washington, D. C."